(12) United States Patent
Fretter et al.

(10) Patent No.: US 12,284,446 B2
(45) Date of Patent: Apr. 22, 2025

(54) APPARATUS FOR ASCERTAINING DATA FOR A PANORAMIC IMAGE OF A STREET AND METHOD RELATED THERETO

(71) Applicant: Parkling GmbH, Berlin (DE)

(72) Inventors: Christoph Fretter, Berlin (DE); Mark Hashimoto, Berlin (DE)

(73) Assignee: Parkling GmbH, Berlin (DE)

( * ) Notice: Subject to any disclaimer, the term of this patent is extended or adjusted under 35 U.S.C. 154(b) by 918 days.

(21) Appl. No.: 17/176,798

(22) Filed: Feb. 16, 2021

(65) Prior Publication Data

US 2021/0266460 A1 Aug. 26, 2021

(30) Foreign Application Priority Data

Feb. 24, 2020 (EP) ..................................... 20159011

(51) Int. Cl.
*H04N 23/698* (2023.01)
*B60R 11/00* (2006.01)
*B60R 11/04* (2006.01)
*H04N 23/54* (2023.01)

(52) U.S. Cl.
CPC ........... *H04N 23/698* (2023.01); *B60R 11/04* (2013.01); *H04N 23/54* (2023.01); *B60R 2011/0017* (2013.01); *B60R 2011/005* (2013.01)

(58) Field of Classification Search
CPC ...... H04N 23/698; H04N 23/54; B60R 11/04; G03B 17/561
See application file for complete search history.

(56) References Cited

U.S. PATENT DOCUMENTS 8,678,680 B1 3/2014 Pelini
2016/0026881 A1* 1/2016 Broggi ................... B60R 11/04
348/47

FOREIGN PATENT DOCUMENTS

JP 2019191807 A * 10/2019 ............... B60R 1/12
WO WO-0161985 A2 8/2001
WO WO-2017102024 A1 * 6/2017 ............ B60L 3/0015

OTHER PUBLICATIONS

Zhou, Yubin, Panoramic Vision System for Autonomous Driving Vehicle, Applied Mechanics and Materials Submitted: Jul. 20, 2014 ISSN: 1662-7482, vols. 644-650, pp. 497-501 (Year: 2014).*
European Search Report issued in corresponding European Patent Application 20 15 9011, dated Aug. 17, 2020 (in German).
Broggi, Alberto et al. "Extensive Tests of Autonomous Driving Technologies", IEEE Transactions of Intelligent Transporation Systems, IEEE, Piscataway, NJ, USA, Bd. 14, Nr. 3, Sep. 1, 20213,Seiten 1403-1415, XP011525557, Issn: 1524-9050, DOI 10.1109/TITS.2013.2262331.

(Continued)

*Primary Examiner* — Christopher E Mahoney
(74) *Attorney, Agent, or Firm* — Harness, Dickey & Pierce, P.L.C.

(57) ABSTRACT

The invention relates to an apparatus for ascertaining data for a panoramic image of a street with a camera and a fastening device. By means of the fastening device the camera can be positioned in or on the vehicle to record image data containing an angle of 90° to the direction of movement of the vehicle. In addition, the camera is designed to record a continuous film with a resolution of more than 1,920 by 1,080 pixels per frame. Furthermore, the invention relates to a method for using the apparatus according to the invention.

17 Claims, 4 Drawing Sheets

(56) References Cited

OTHER PUBLICATIONS

Anonymous: "Point Grey Camera Selector Tool", Jun. 21, 20212, Seiten 1/2-2/2, XP055721688, Gefunden im Internet: URL:https://web.archive.org/web/20120621034047/http://ptgrey.com/camera_selector/Default.aspx.
Anomymus: "Grasshopper Express", Jun. 9, 2012, Seiten 1-1, XP03026474, Gefunden im Internet: URL: https://web.archive.org/web/20120609061303if_/http://www.ptgrey.com/products/grasshopper_express/Datasheet_GrasshopperExpress.pdf [gefunden am Feb. 23, 2023].
Brawleyl William: "Sony A7S Review—Field Test Part II", Oct. 27, 2014, Seiten 1-23, XP093026561, Gefunden im Internet: URL:https://www.imaging-resource.com/PRODS/sony-a7s-field-test-part-ii.htm [gefunden am Feb. 23, 2023].

* cited by examiner

APPARATUS FOR ASCERTAINING DATA FOR A PANORAMIC IMAGE OF A STREET AND METHOD RELATED THERETO

CROSS REFERENCE TO RELATED APPLICATIONS

This application claims the priority to European Patent Application No. 20 159 011.4, filed Feb. 24, 2020. The entire disclosure of the above application is incorporated herein by reference.

TECHNICAL FIELD

The invention relates to an apparatus for ascertaining data for a panoramic image of a street with a camera and with a fastening device to attach the camera in or on a vehicle. The camera is fixed on the fastening device and can be positioned in or on the vehicle by means of the fastening device in order to record at least image data at an angle of 90° to a direction of movement of the vehicle when the vehicle is in motion. Furthermore, the invention relates to a vehicle and a method for ascertaining data for a panoramic image of a street with a vehicle.

BACKGROUND

As a result of the increasing population growth in urban regions, traffic is increasing, in particular also the individual traffic in passenger cars. Especially in the inner-city area this massive increase in traffic density leads to problems which cause a shortage of space that can no longer be solved by simple means. Further problems are the concomitant noise pollution through traffic but also the exposure to contaminants which, in the meantime, is being increasingly regarded with concern.

Studies have shown that approximately 30% of inner-city traffic is not classical transportation traffic, but rather traffic that can be ascribed to vehicles in search of a parking space.

Projections for Germany reveal that 1.9 billion hours are spent on searching out parking spaces. For this, 3.2 billion liters of fuel are consumed. All in all, an economic loss in the amount of 40.4 billion Euro is assumed.

Therefore, the call for a parking space management system and method that reduces this traffic in search of a parking space is making its presence felt to an increasing extent.

In the case of such systems a basic distinction is made between two states of data ascertainment. On the one hand, static data would have to be obtained, which indicate where parking spaces are located, at which times parking in these parking spaces is permitted, and which also provide information as to how the parking spaces are to be parked in, e.g., as lengthways or cross-wise parking. This also includes information about no-parking zones as well as possible parking fees. Such data are referred to as static data and constitute the fundamental prerequisite for a parking space management system.

The second state of data ascertainment resides in ascertaining so-called dynamic data which represent information on the current parking space occupancy situation.

One possibility of ascertaining static data is known from DE 10 2018 214 510 A1 for example. In this case, however, only information as to whether a parking space is present or not can be ascertained. Data indicating at which times parking is permitted or whether the identified space is merely a driveway, for example, can only be established with great difficulty.

On the one hand, it is known from the Google STREET VIEW® application, for example, that by means of vehicles georeferenced panoramic images, i.e., 360° images, are produced from different positions in a street. However, such data are not enough to generate sufficient information required for the calculation of static parking space data. For instance, the positions of individual permitted parking spaces cannot be ascertained at all or only with great difficulty. Similarly, data on allowed parking times and the like are often not visible either.

SUMMARY

The invention is therefore based on the object to provide an apparatus and a method for ascertaining data for a panoramic image of a street which are efficient and easy to generate and provide a sufficiently high data quality.

In accordance with the invention this object is achieved by an apparatus having the features of claim 1, a vehicle having the features of listed in the appended claims.

Advantageous embodiments of the invention are set forth in the Figures and their explanation.

According to the apparatus pursuant to the invention, provision is made in that a camera is designed to record a continuous film with a resolution of more than 1,920 pixels by 1,080 pixels per frame.

The invention is based on several fundamental ideas, on the one hand the realization was made that especially with regard to graphic information existing in streets, it is necessary to record images of a street rather than scanning potential parking spaces by way of ultrasound or LIDAR sensors.

On the other hand, in accordance with the invention the realization was made that it is not sufficient either to produce individual images of the street, for instance every 5 meters or every 10 meters. Such images are insufficient to ensure the required accuracy for a subsequent processing as static parking space data. Consequently, according to the invention the suggestion is made to record a continuous film with the camera. In other words, a film of the street is produced while driving.

Another realization on which the invention is based is that even hitherto, existing standard HD-resolutions are not suitable to achieve sufficiently good accuracy of detail so that e.g., parking space signage located at a distance of 5 to 10 meters can be detected in sufficient detail for a subsequent evaluation. Therefore, according to the invention, the camera is operated with a higher resolution than HD, preferably 4K UHD, i.e., in the range of 3,840 pixels by 2,160 pixels.

Furthermore, according to the invention it is essential that during recording of the data a part of the recorded film contains image data that are recorded precisely in the angle of 90° to the movement axis of the vehicle or rather to the main direction of travel of the vehicle. Such data are necessary to allow a calculation as efficient and easy as possible of the panoramic image of a street to be produced.

It is advantageous if the fastening device is provided in the interior of the vehicle. To connect the fastening device as stably and firmly as possible to the vehicle it can be fastened by means of ISOFIX fastenings and/or a headrest on a seat of the vehicle. In this way, the fastening device can be fixed e.g., on the back seat of a car. Basically, it is also possible to provide the fastening device in several places, for example in the trunk if a station wagon is used. What is important here is that it is possible for a camera fixed on the fastening device to film from the vehicle at the angle of 90° to the direction of movement.

Furthermore, it is advantageous if the fastening device has a camera arm, on which the camera is fixable. By preference, this camera arm is of pivotable design. Basically, in Europe most of the parking spaces in a street are located on the right side. However, in one-way streets parking is allowed both on the right and the left side in the direction of travel. To produce static data, i.e., the film according to the invention, also for such one-way streets, the fastening device is designed with the camera arm which, for its precise positioning, is designed in a horizontally pivotable manner. As a result, the fastening device can be placed in such a way in the vehicle that the continuous film can also be produced on both sides, the left as well as the right side in the direction of travel.

In conjunction with this, the camera arm can be of rocker-like design with two fastening points for the camera that are designed at remote ends. Such a design facilitates conversion of the fastening device from one side to the other side of the vehicle.

In other words, the fastening device can be designed such that it can be mounted on the back seat of a vehicle. For better fixation of the fastening device the ISOFIX fixations existing in most cars can also be used as fastening points on the headrest. The camera is then fastened on the camera arm so that it is located as close to the side window as possible. If filming is to take place from the other side of the car, the fastening device is placed onto the other side of the car and the camera is changed from one end of the camera arm over to the other end of the camera arm. In this case, too, placement of the camera is carried out such that it is fixed as close to the window as possible.

Basically, in the fixed state of the fastening device the camera can be mounted at any chosen height with respect to the street level. Particularly good results for detection of the static data and for the purpose of facilitating the subsequent calculation of the data are obtained if the camera is mounted in relation to the street level at a height of 1.0 meters up to 1.8 meters, advantageously between 1.0 meters and 1.5 meters, by preference at around 1.2 meters. These dimensional indications each apply to the case that the fastening device is attached in or on the vehicle. With the cameras available on the market, a film shot at the height of approximately 1.2 meters provides an adequate capture area of the camera so that signs placed in proximity to the street can also be detected.

Basically, the camera and the fastening device can be of any chosen design. However, it is preferred if the two are designed in combination such that, in the fixed state on the fastening device, the camera can be operated to produce the continuous film in the upright format. In most cases, commonly used cameras have a recording format at a ratio of 4:3 or 16:9 or 10. By providing the camera position to film in the upright format it is in turn rendered easier that signs which are located close to the camera, and therefore tending to be high, are recorded in their entirety. In this way, in particular the information content of the images of the film is increased too. In addition, the amount of image data ascertained is also increased thereby, because when the vehicle moves on the street, a continuous scan, or rather an adequate recording, is produced in the direction transverse to the upright format of the direction of travel.

Furthermore, in the fixed state of the camera, the camera and the fastening device can be designed to obtain recordings of the continuous film with a capture angle of at least 90° in the vertical and/or at least 50° in the horizontal. In other words, a wide-angle lens is used that has at least the previously stated capture angles. This ensures that all relevant data are present on the produced film. This means that not only signs placed close to the street, but also signs placed at a distance, can be recorded with sufficient accuracy.

To facilitate subsequent processing it is preferred if, in the fixed state of the camera, the camera and the fastening device are designed to record the continuous film with a capture angle of at least 45° horizontally in the direction of travel of the vehicle, and at least 5° horizontally in a direction opposed to the direction of travel of the vehicle. The horizontal capture angle of at least 50° is thus composed of 45° of the vertical to the direction of travel and aligned in the direction of travel and at least 5° in a direction opposed to the direction of travel. Such a distribution facilitates the subsequent evaluation as the vehicle moves in the direction of travel during recording.

The panoramic image of a street is produced through a corresponding sequential arrangement of the images produced by the continuous film, with an optimum selection being made in each case, and only image sections of the continuous film being used.

Basically, use can be made of any type of camera. It has proved to be advantageous if the camera can be operated at least with a shutter speed of 1:3,000 seconds, in particular 1:4,000 seconds and/or a light sensitivity of at least ISO 20,000, by preference ISO 51,200 and/or with an aperture of at least 4, by preference 5.6.

Such a selection stems from the desire to also record data, which can be used to produce a panoramic image of a street, in wintertime in the afternoon in Northern Europe for example. In this connection, consideration must on the one hand be given to the fact that with the aperture selected, a largest possible area of the recording is in focus so that the data can be evaluated correspondingly. For this, the aperture is preferably set such that the recording is in focus from a distance of 2 meters, preferably a distance of 1.5 meters to infinity within the framework of a hyperfocal distance. Basically, an exposure time as short as possible is desirable to produce focused recordings. Account should be taken of the fact that during production of the continuous film, the vehicle moves in city traffic at an average speed of 40 km/h up to 50 or 60 km/h. The aperture selected, as well as the corresponding fast shutter speed, require the high light sensitivity of at least ISO 20,000.

Furthermore, the invention relates to a vehicle with an apparatus according to the invention for ascertaining data for a panoramic image of a street, as described beforehand.

Finally, the invention relates to a method for ascertaining data for a panoramic image of a street with a vehicle, wherein the apparatus according to the invention is installed in the vehicle, the vehicle is moved in road traffic and by means of the apparatus a continuous film is produced during movement of the vehicle in road traffic.

Based on these film data, a panoramic image of a street can then be produced downstream.

As is well known, a film simply consists of many individual images recorded in succession. By selecting the camera and the positioning of the camera, areas of these individual images can then be assembled accordingly so that a panoramic image of a street is developed that shows hardly any optical distortions, and which can be used for further evaluation, for example for the generation of static parking space data.

BRIEF DESCRIPTION OF DRAWINGS

The invention is explained in greater detail hereinafter by way of a schematic exemplary embodiment with reference to the Figures, wherein.

DETAILED DESCRIPTION

In the following the alignment of an apparatus 10 according to the invention with a camera 20 in a vehicle 40 is explained in greater detail with reference to FIGS. 1, 2 and 3.

Figure 1:
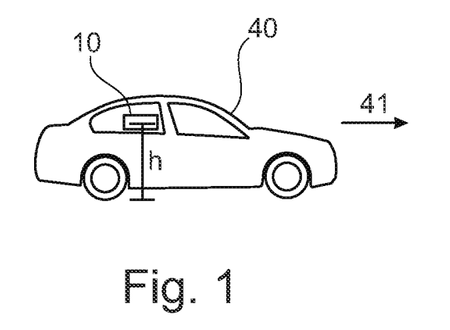
FIG. 1 is a side view of a vehicle with an apparatus according to the invention.
Figure 2:
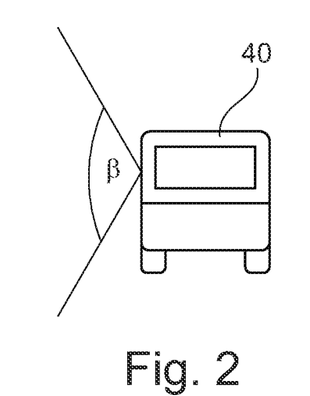
FIG. 2 is a front view of a vehicle with an apparatus according to the invention.
Figure 3:
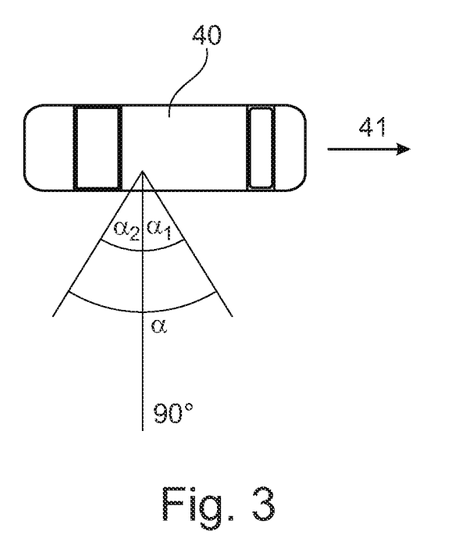
FIG. 3 is a top view of a vehicle with an apparatus according to the invention.
Figure 3A:
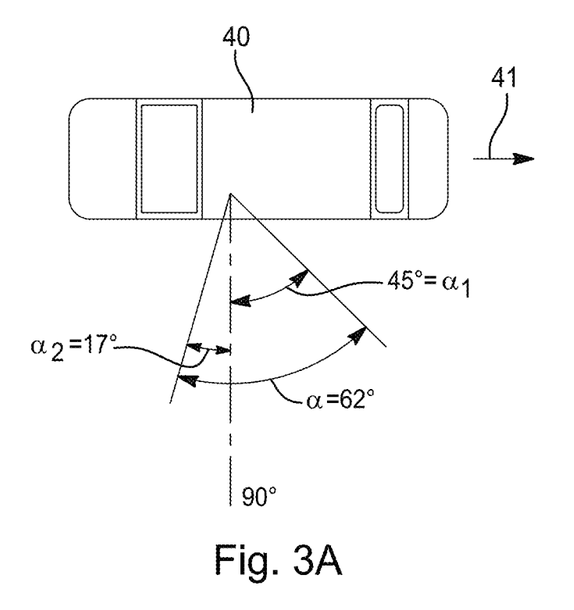

In FIG. 1 the vehicle 40 is illustrated in a side view, in FIG. 2 in a front view and in FIG. 3 in a view from above.

Figure 4:
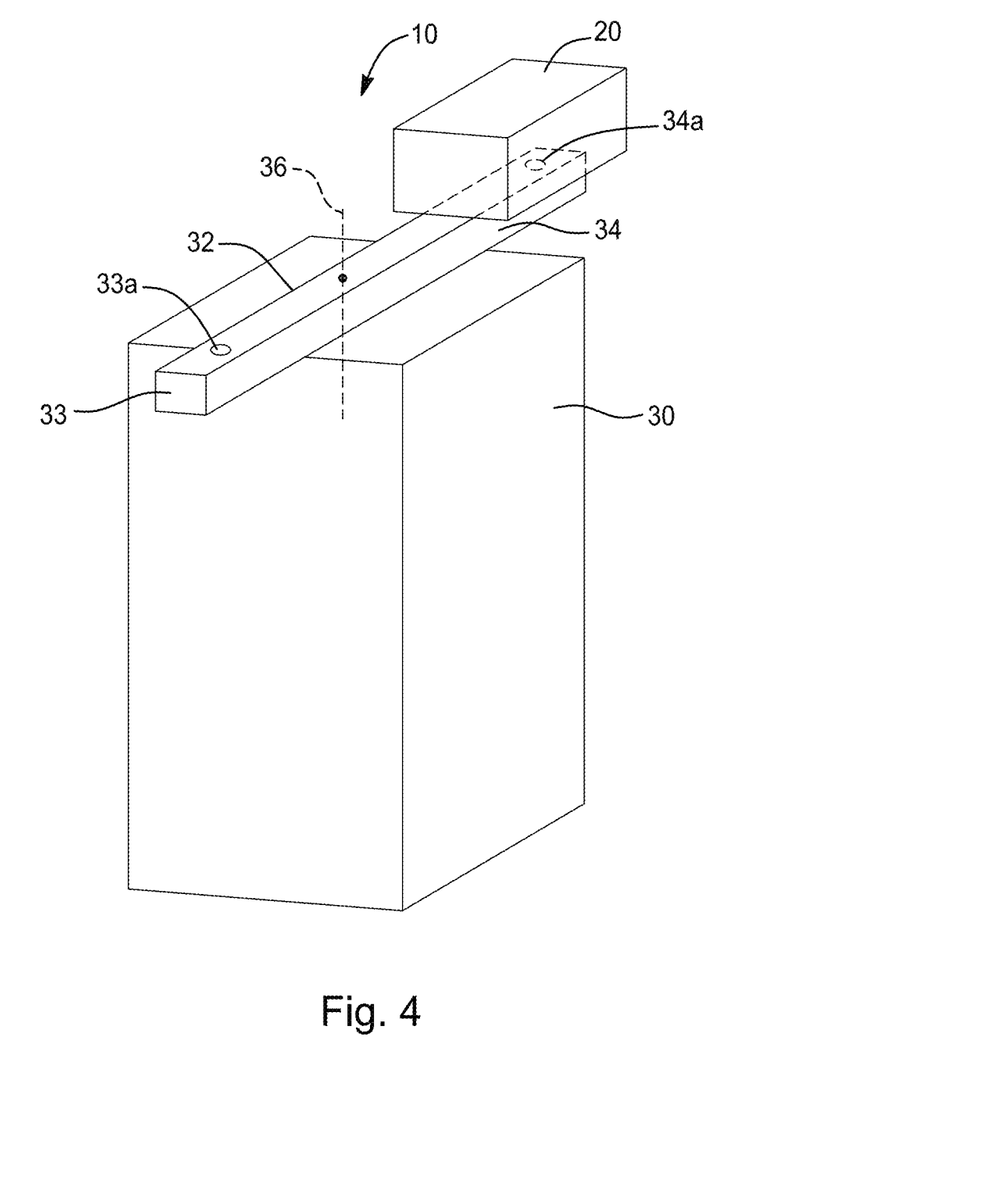
FIG. 4 is a schematic illustration of a fastening device of an apparatus according to the invention.

The apparatus 10 according to the invention has the camera 20 firmly fixed in the vehicle 40 by means of a fastening device 30 illustrated in FIG. 4. This means that the camera 20 is attached in the most robust and secure way possible in the vehicle 40.

Figure 5:
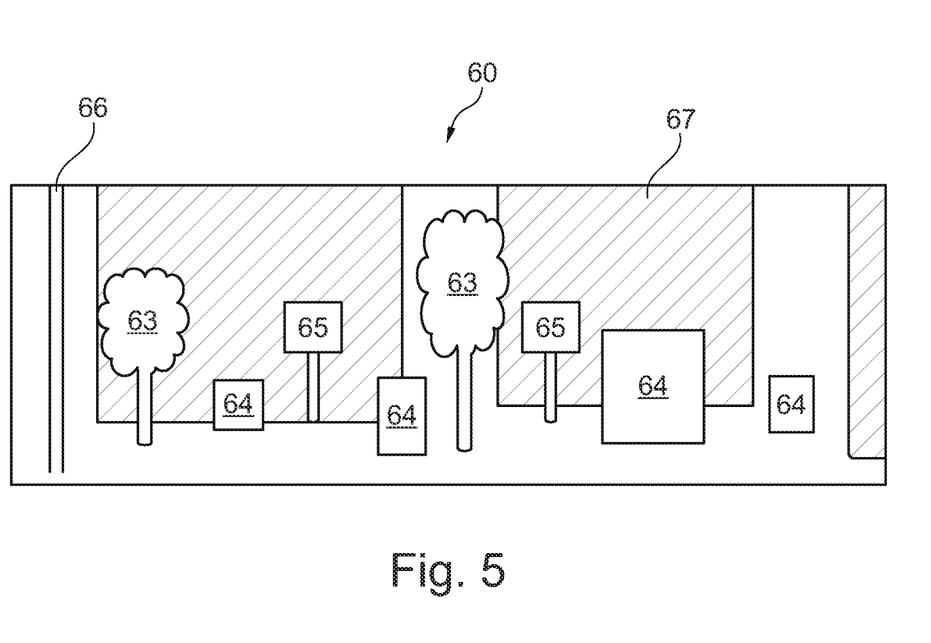
FIG. 5 is a highly simplified panoramic image of a street.

During travel of the vehicle 40 a continuous film is recorded with the camera 20, preferably at least in the 4K UHD standard, i.e., with at least 3,840 pixels by 2,160 pixels and 24 images per second. The objective is to produce on the basis of this film a panoramic image of a street 60 in the most realistic and undistorted way possible, as shown in FIG. 5.

This panoramic image of a street 60 can be used to ascertain static data for a parking space management. For this purpose, what needs to be captured on the panoramic image of a street 60 is on the one hand the curbside, and on the other hand also signs which are located relatively close to the curbside, and on which information on parking times or the like may be displayed.

Therefore, the camera 20 is placed as close to the window of the vehicle 40 as possible using the fastening device 30. The camera 20 is preferably arranged at a height h of approximately 1.2 meters, by preference at a height of 1.21 meters.

The camera 20 can have a wide-angle lens. This can have a focal length of 20 mm for example.

As can be taken from FIGS. 2 and 3, the camera 20 is arranged in upright format. This means that the camera angle β that constitutes the vertical capture angle is larger than the camera angle α that indicates the horizontal capture angle.

According to the invention, a wide-angle lens is chosen that has e.g., a vertical capture angle of around at least 100°, preferably 107°, and a horizontal capture angle of over 55°, preferably 62°.

The camera 20 is arranged in such a way in the vehicle 40 that the vertical capture angle β is substantially evenly distributed. This means that the same part of the capture angle β lies in an area of over 90°, i.e., a parallel to the street surface, and under 90°.

In contrast, according to the invention, the camera 20 is aligned differently for the horizontal capture angle α. It is essential that the area of 90° to the direction of travel 41 is included in the capture angle α. To facilitate the production of the panoramic image of a street 60, the camera 20 is arranged in such a way in the vehicle 40 that a major part of the capture angle α is arranged facing forwards in the direction of travel. For instance, the capture angle $α_1$ that describes the area from the 90° line towards the front in the direction of travel can amount to 40°, preferably to over 45°. Accordingly, the capture area $α_2$ that relates to the capture area of angle α aligned in a direction opposed to the direction of travel lies in an area of 17° with an entire capture area α amounting to 62°.

Such an arrangement proves to be advantageous as the vehicle 40 moves in the direction of travel 41, as already outlined, and in this way the camera 20 is aligned in a forward-facing manner which also enables the capturing of traffic signs that are aligned transversely to the street for example.

As camera 20, use is preferably made of a camera having a high light sensitivity, for example in the range of ISO 51,200, a shutter speed of 1:4,000 seconds and an aperture of 5.6. The objective is that during recording an area from as close as possible to the vehicle 40, e.g., from 1.25 meters up to infinity, is recorded as focused as possible so that these data can subsequently be evaluated as static data for a parking space management system.

In FIG. 4 a highly schematic illustration of a fastening device 30 is shown. The essential aspect of the fastening device 30 is that it can be attached in the vehicle 40 in the most firmly fixed way possible. For this purpose, it can emulate the contour of the back seat for example.

To ascertain sufficient data for static data of a parking space management it is necessary to film both on the right and on the left side from a vehicle 40. For this, the fastening device 30 has a camera arm 32. This is in turn fastened in such a way on the fastening device 30 that it can be pivoted or turned easily about its axis 36, where the camera arm 32 is pivotally mounted at mounting point 32a. This is necessary so that the camera 20 can be arranged in such a way at an end 33 (e.g., at fastening point 33a) of the camera arm 32, or at end 34 (e.g., at fastening point 34a) of the camera arm 32, that it has the previously described capture angle in the horizontal a that is directed towards the front.

If, for example, the left side of a street is filmed first by means of the camera 20, the fastening device 30 is initially located on the left side of the vehicle 40 (i.e., at end 34 of the camera arm 32). Afterwards, it can be shifted to the right side of the vehicle 40 and the camera 20 can be mounted at the other end 33 of the camera arm 32. Now, filming from the right window of the vehicle 40 is possible.

Finally, in FIG. 5 a highly schematic example of a produced panoramic image of a street 60 is illustrated. When preparing the data, the continuous film data produced by the camera 20 are prepared and assembled to a panoramic image of a street 60 that has no or hardly any optical distortions where possible. On the panoramic image of a street 60, not only individual objects 64, such as cars or trucks located on parking spaces, but also signs 65, can then be recognized. On these signs 65 parking information can be present for example. Likewise, complete streetlamps 66 or sections thereof are illustrated for example. What is important here is that the curbside is present in order to ascertain a sufficient amount of data for static information for the parking management system. The objects shown hatched in FIG. 5 are for example houses 67 located in the background.

By way of the apparatus according to the invention and the method according to the invention, it is thus possible to produce a panoramic image of a street which constitutes the basis for static data in a parking management system.

The invention claimed is:

1. An apparatus for ascertaining data for a panoramic image of a region adjacent to a street along which a vehicle is travelling, the apparatus comprising:
   a single camera;
   a fastening device to attach the camera to a vehicle;
   wherein the camera is fixed on the fastening device and is configured to be positioned in or on the vehicle by means of the fastening device in order to record at least image data at an angle of 90° to a direction of movement of the vehicle when the vehicle is in motion;
   wherein the camera is secured to the fastening device to enable the camera to record the image data as a continuous film, and such that the camera is oriented relative to the vehicle to have a horizontal capture angle of at least 50° defined by a first angular portion ($\alpha 1$) of at least 45° horizontally in the direction of travel of the vehicle, and second angular ($\alpha 2$) of at least 5° horizontally in a direction opposed to the direction of travel of the vehicle;
   wherein the camera is further supported by the fastening device in an upright orientation such that a vertical capture angle $\beta$ of the camera is equal to or greater than the horizontal capture angle;
   wherein the fastening device is configured to be firmly connected to the vehicle; and
   wherein the camera is designed:
      to record the continuous film with a resolution of more than 1,920 pixels by 1,080 pixels per frame;
      to be operated with a shutter speed of at least 1/3,000 seconds, and with a light sensitivity of at least ISO 20,000.

2. The apparatus according to claim 1, wherein:
   the fastening device is configured to be secured in an interior area of the vehicle; and
   the fastening device is configured to be fastened at least by means of an ISOFIX fastening and/or a headrest on a seat of the vehicle.

3. The apparatus according to claim 2, wherein the camera is configured to be operated with an aperture of at least f4.

4. The apparatus according to claim 1, wherein the fastening device has a camera arm, on which the camera is fixed, and the camera arm is configured to be pivotable in a horizontal orientation.

5. The apparatus according to claim 4, wherein the camera arm is of rocker-like design with two fastening points for the camera that are designed at remote ends.

6. The apparatus according to claim 1, wherein when the camera is fixed to the fastening device, the camera has a height above a street level ranging between 0.8 m and 1.8 m.

7. The apparatus according to claim 6, wherein the height of the camera above a street level is between 1.0 m and 1.5 m.

8. The apparatus according to claim 6, wherein the height of the camera above a street level is about 1.2 m.

9. The apparatus according to claim 1, wherein the fastening device is attached at least one of:
   within an interior area of the vehicle; or
   on an exterior surface of the vehicle.

10. The apparatus according to claim 1, wherein when the camera is secured in a fixed state on the fastening device, the camera and the fastening device are designed to produce the continuous film in the upright format.

11. The apparatus according to claim 1, wherein the camera is configured to be operated to record in focus in a range of a distance of at least 2 m to infinity.

12. The apparatus according to claim 1, further comprising the vehicle.

13. A method for ascertaining data for a panoramic image of a region adjacent to a street along which a vehicle is travelling, using the vehicle, the method comprising:
   providing a single camera;
   using a fastening device to attach the camera to the vehicle;
   securing the camera to the fastening device to enable the camera to record the image data as a continuous film, and such that the camera is oriented relative to the vehicle to have a horizontal capture angle of at least 50° including a first angular portion ($\alpha 1$) of at least 45° horizontally in a direction of travel of the vehicle, and a second angular portion ($\alpha 2$) of at least 5° horizontally in a direction opposed to the direction of travel of the vehicle, when the vehicle is in motion;
   further securing the camera to the fastening device such that the camera is supported by the fastening device in an upright orientation, and further such that a vertical capture angle $\beta$ of the camera is equal to or greater than the horizontal capture angle; and
   controlling the camera:
      to record the continuous film while the vehicle is moving in road traffic, the camera having a resolution of more than 1,920 pixels by 1,080 pixels per frame; and
      to operate with a shutter speed of at least 1/3,000 seconds.

14. The method according to claim 13, further comprising controlling the camera to operate with a light sensitivity of at least ISO 20,000.

15. The method according to claim 13, further comprising configuring the fastening device with a camera arm on which the camera is supported, and further such that the camera arm is pivotable in a horizontal orientation.

16. The method according to claim 13, further comprising configuring the fastening device with a camera arm having rocker-like design with two fastening points for the camera that are disposed at remote, opposite ends of the camera.

17. An apparatus for ascertaining data for a panoramic image of a region adjacent to a street along which a vehicle is travelling, the apparatus comprising:
   a single camera;
   a fastening device to attach the camera to the vehicle;
   wherein the camera is fixed on the fastening device and is configured to be positioned in or on the vehicle by means of the fastening device in order to record at least image data at a field of view angle of 90° to a direction of movement of the vehicle when the vehicle is in motion, wherein a majority of the field of view angle of 90° is directed in a direction of travel of the vehicle, and the image data forms a continuous film;
   wherein the camera is further supported by the fastening device in an upright orientation such that a vertical capture angle $\beta$ of the camera is equal to or greater than the horizontal capture angle;
   wherein the fastening device is configured to be firmly connected to the vehicle; and includes an elongated camera arm on which the camera is fixed, and the camera arm is configured to be pivotable in a horizontal orientation to enable adjustable positioning of an angle of view relative to the vehicle, and wherein the camera arm is of rocker-like design with two fastening points for the camera that are designed at remote ends, the two fastening points enabling the camera to be secured adjacent either a driver's side of the vehicle or a passenger side of the vehicle;

the camera further being fixed to the fastening device such that the camera has a height above a street level ranging between 0.8 m and 1.8 m and provides a vertical capture angle of at least 100 degrees, and the camera and the fastening device produce the continuous film in an upright format; and wherein the camera is designed:

to record the continuous film with a resolution of more than 1,920 pixels by 1,080 pixels per frame;

to be operated with a shutter speed of at least $1/3,000$ seconds, and with a light sensitivity of at least ISO 20,000.

* * * * *